United States Patent [19]
Courtright

[11] 3,856,039
[45] Dec. 24, 1974

[54] AGRICULTURAL WHEEL-LINES

[75] Inventor: Burr Courtright, Le Grande, Oreg.

[73] Assignee: CH₂O, Inc., LeGrande, Oreg.

[22] Filed: Nov. 7, 1973

[21] Appl. No.: 413,703

[52] U.S. Cl................. 137/344, 239/111, 239/212, 239/286, 285/190
[51] Int. Cl............................................. B05b 15/02
[58] Field of Search ........... 239/111, 177, 212, 286; 137/344; 285/190

[56] References Cited
UNITED STATES PATENTS

| | | | |
|---|---|---|---|
| 3,002,697 | 10/1961 | Jones | 239/212 |
| 3,143,298 | 8/1964 | Jones | 239/212 X |
| 3,272,438 | 9/1966 | Purtell | 239/212 |
| 3,312,236 | 4/1967 | Stewart | 239/212 X |
| 3,516,609 | 6/1970 | Gheen et al. | 239/212 |
| 3,603,508 | 9/1971 | Ingram et al. | 239/212 X |
| 3,807,638 | 4/1974 | Clements | 239/212 |

Primary Examiner—M. Henson Wood, Jr.
Assistant Examiner—Andres Kashnikow
Attorney, Agent, or Firm—M. Ralph Shaffer

[57] ABSTRACT

Agricultural wheel-line and coupler structure wherein a trailweight and/or fluid-carrying counterweight device co-acts with a swivel coupler to maintain in upstanding condition the riser of a water delivery system. The subject structure is especially useful in wheel-line systems in which water pressure is used both to power the wheel line and also to supply water for spray delivery.

14 Claims, 8 Drawing Figures

PATENTED DEC 24 1974 3,856,039
SHEET 1 OF 2
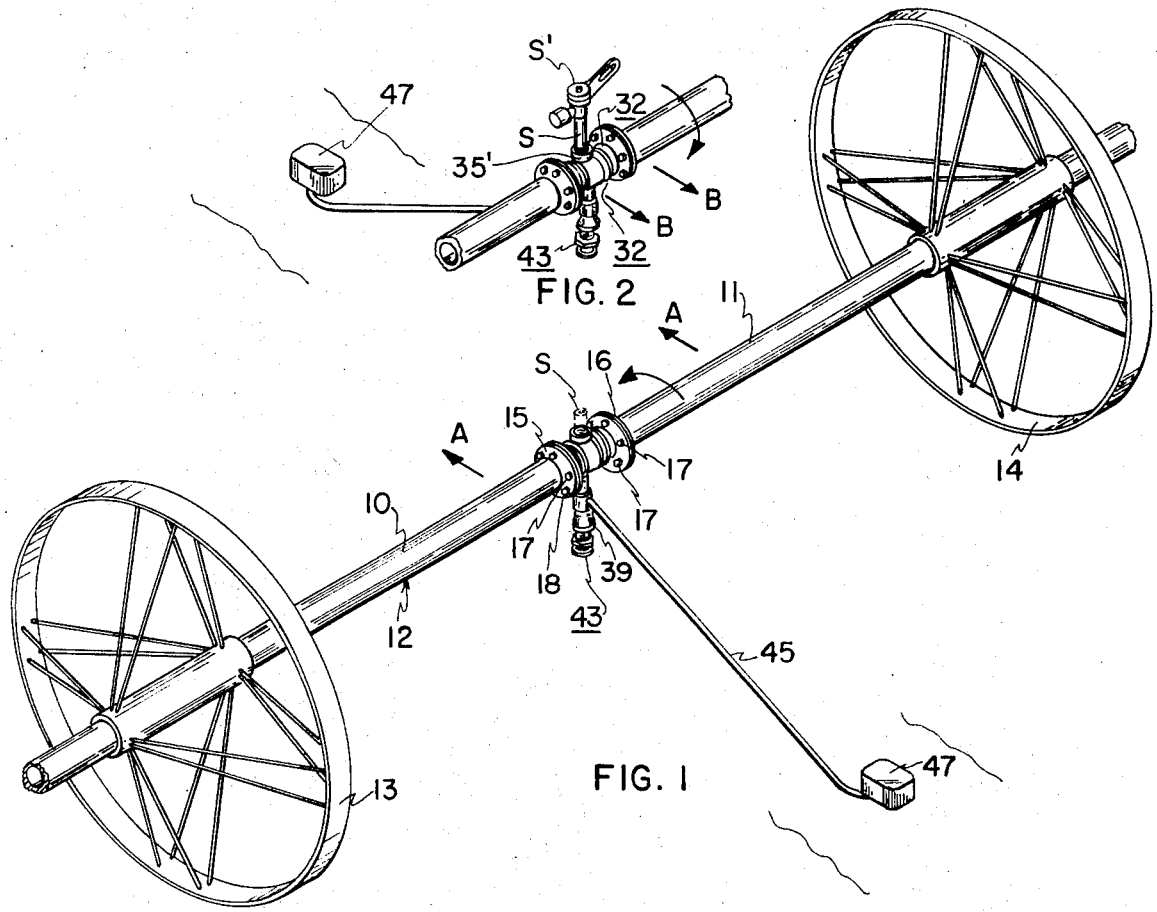
FIG. 2
FIG. 1
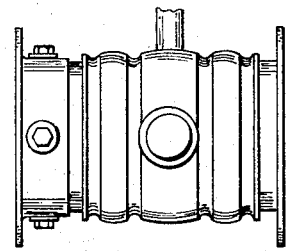
FIG. 3
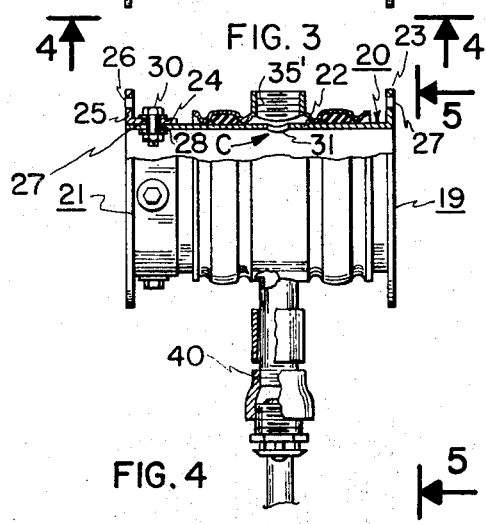
FIG. 4
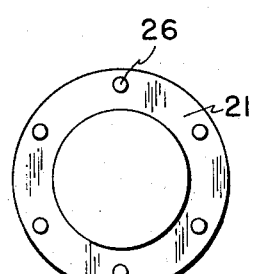
FIG. 5

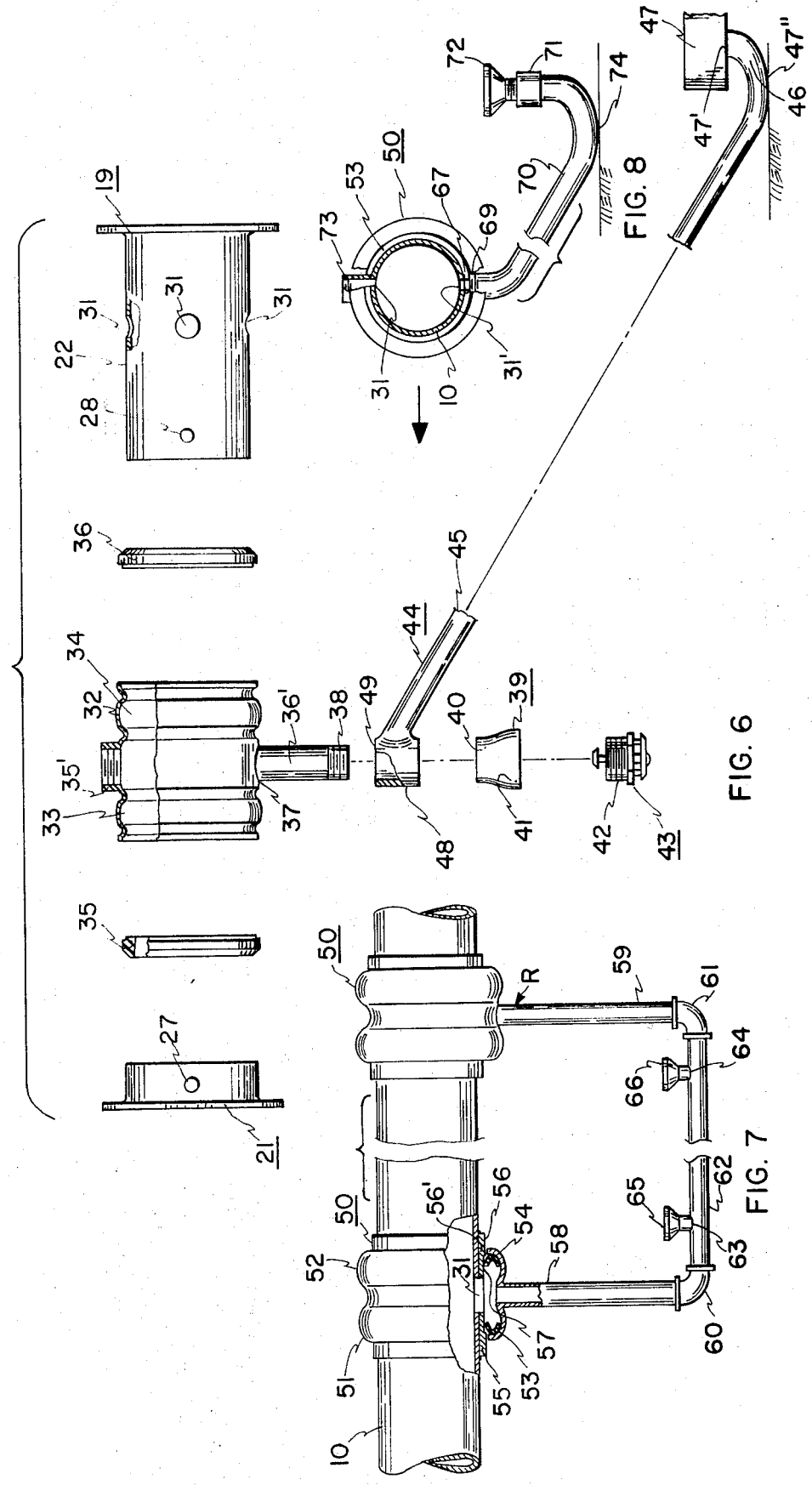

AGRICULTURAL WHEEL-LINES

The present invention relates to agricultural wheel-lines, and, more particularly, presents a wheel-line structure that can be pressure-operated for irrigation purposes while the wheel-line actually advances over a given field.

The present state of the art is to advance a side-roll wheel-line to a given location, insure that the fixed sprinkler risers are upstanding, then apply water pressure to the line to deliver water to the sprinklers, then turn off the water and drain the line, and finally power the wheel line to a new location for a second sprinkling operation.

This procedure is slow and cumbersome, and also chances bending and distortion-set in the wheel-line where the ground support plane at which the wheel-line rests is undulating.

Attempts at designing self-leveling sprinklers have not been made for delivering water while the line is in motion and, in fact, would be unsatisfactory since the central conduit of the wheel-line would cause spray interruption at least twice during each wheel-line revolution.

The present invention affords simultaneous irrigation spraying with physical advance of the wheel-line in a continuous manner. The water pressure loading of the wheel-line, "stretches" the line, in the sense of restoring the rectilinear character of the line upon and after the passage by particular wheels over high or low spots, and thus deters deflection set. The swivel water jacket element is counter-balanced by gravity and/or a ground-plane responsive structure so that the sprinklers and/or sprinkler risers are normal to, i.e., perpendicular to the ground plane of the terrain under the wheels. Seal friction or seizure is thus overcome so that the sprinklers can operate in their erect manner while the wheel-line is moving. The wheel-line conduit thus now serves simultaneously as a wheel-torque transmission as well as conduit for water under pressure to the sprinklers.

Accordingly, a principal object is to provide novel equipment which, with a minimum of labor and time involved, insures as high as possible a coefficient of uniformity in water application, and this with minimum structure.

Another object of the present invention is to supply side-roll wheel-line structure that can be simultaneously pressure-fed, for present irrigation, and simultaneously physically driven over given terrain, preferably being powered by the water pressure itself.

A further object is to provide a swivel-type water jacket structure that is counter-balanced to maintain sprinkler structures in erect position during the entire revolvement cycle of the wheel-line central conduit.

A further object is to provide a water-jacket swivel-type structure which includes counter-balancing and/or gravity means for insuring continuous erection of the water delivery structure.

Another object is to provide a new, self-aligning swivel coupler or sleeve in a water delivery system.

While preferred embodiments are specifically disclosed in detail hereinafter, showing utilization of an angulated, depending ground-plane contacting leg, it will be understood that the present invention comprehends all counter-weight, gravity, and/or ground-plane reacting counter-balance means, attached to the subject revolving water jacket, and operative to maintain such water jacket against revolvement relative to the wheel-line conduit structure, itself revolving within such jacket to provide torque to the carrying wheels.

In the broader sense, then, the present invention teaches, uniquely, that side-roll wheel-lines can be, and by this invention, will be designed so as to be continuously operable in delivering water sprays to a field while the wheel line itself is moving across such field. The subject water jacket or sleeve, of course, may be sealingly disposed over a unitary central conduit, boss or sleeve thereat, rather than taking the form of a coupler between two coaxial conduits.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a portion of a wheel-line incorporating the swivel coupler structure of the present invention.

FIG. 2 is a fragmentary perspective view, similar to the central portion in FIG. 1, that illustrates a reversal of disposition of the trail weight when the wheel-line is revolving in a direction counter to that shown in FIG. 1.

FIG. 3 is a top plan of the coupler structure of FIGS. 1 and 2.

FIG. 4 is an elevation of the structure of FIG. 3 and is taken along the line 4—4 in FIG. 3; a portion of the ladder is shown in section.

FIG. 5 is an end view of the coupler structure taken along the line 5—5 in FIG. 4.

FIG. 6 is an exploded view of the complete swivel coupler including the trail weight.

FIG. 7 is an enlarged, fragmentary, rear elevation, partially in section, of a wheel-line central conduit having, as counter-weight means, a depending, U-configured water delivery-structure.

FIG. 8 is a transverse section of the wheel-line central conduit wherein, depending rearwardly from the water-jacket thereof, is a conduit leg terminating in an upstanding sprinkler representing one form of water-delivery structure.

In FIG. 1 central conduit 10 and 11 of wheel-line 12 have respectively mounted thereon wheels 13 and 14. These will generally be keyed to the central wheel-line conduit 11 and 12 but can be journaled, if desired, if other traction or force is to be supplied.

In any event, conduit 10 and 11 are each provided with attachment flanges 15 and 16 that are provided with bolt and nut attachments 17 and apertures 18 for securing the coupler unit centrally in place. The coupler unit itself is indicated principally in FIG. 4 and is identified as unit 20. The same includes a flanged tubular member 19 and a flanged collar 21, the former including cylindrical body portion 22 and flange 23, and the later including cylindrical ring end 24 and flange 25. Flanges 23 and 25 are provided with apertures 26 and 27 for receiving bolt attachments 17.

In FIG. 6, flanged collar 21 is shown to include apertures 27' arranged in quadrature. Member 19 is shown to include attachment apertures 28 which are brought into alignment with apertures 27' for receiving bolt and nut attachments 30 as seen in FIG. 4.

Flanged tubular member 19 includes a series of wall apertures or passageways 31 which, of course, are provided for the passage of water from the conduit 10 and 11 to outer sleeve member 32. Outer sleeve member 32 includes peripheral, convoluted portions 33 and 34 which serve as seats for peripheral sealing rings 35 and 36. These sealing rings thus provide a water-seal fit as between outer sleeve member 32 and cylindrical portion 22.

Welded, soldered, or threaded into member 32 is an interiorly threaded nipple 35', the same being designed for a riser pipe S intended for mounting to a water delivery spray nozzle S'. Secured to the underside of member 32 is a nipple 36', same being threaded into or otherwise secured into aperture 37 of member 32. Lower portion 38 of nipple 36' is threaded and threads into bell coupling 39 at threaded portion 40.

Bell coupling 39 is interiorly threaded at 41 for receiving the threaded portion 42 of valve 43. Valve 43 may be a standard part known as a drain valve and manufactured, for example, as part No. 2314AL by the Gheen Irrigation Works of Oregon. Drain valves are common valves which close when pressure is applied but which open, and thereby afford draining, when water pressure is turned off. They operate in a standard fashion well known in the art.

Weight extension 44 includes an elongate leg 45 and a foot 46 the bottom surface 47'' of which is adapted to slide over ground or turf. Trailweight or counterweight 47 is supported by and affixed to foot 46. Leg 45 includes a hollow boss 48 having aperture 49 which is disposed for swiveling movement about nipple or stem 36'.

In assembly, the parts are positioned as shown in FIG. 6, and member 19, with seals 35 and 36 being in place, in seats 33 and 34; flanged tubular member 20 is urged through the seals and the outer sleeve member 32 to come into engagement with member 21 such that apertures 28 become aligned with apertures 27. Thereupon, the bolt and nut attachment means 30 of FIG. 4 are installed and, next, the swivel structure of FIG. 6 and 4 is placed intermediate the central conduit or wheel axles 10 and 11. At this juncture, the bolt and nut attachment means 17 are installed.

FIG. 6 illustrates that after the nipples are in place at either the manufacturing point or in the field, then the boss is slipped over nipple 36' and the bell coupling 39 is threaded at 40 onto threaded end 38. Subsequently, the valve 43 is threaded into the bell housing.

Trailweight or counterweight 47 may be welded or otherwise secured to the upstanding end 47' of foot 46, or leg 45 itself may be built sufficiently heavy to perform the weighting function.

In operation, the structure of FIG. 1 in being advanced in the direction of the arrows A tend to carry or drag the trailweight structure behind. In the event of reversal of the wheel-line as shown in arrows B, then the counterweight 47 is carried to a position of 180° away from that shown in FIG. 1 so that, as seen in FIG. 2, the weight again advances rearwardly of the wheel-line proper. The hollow boss 48 in FIG. 6 renders possible the swiveling of the counterweight and its extended leg 45. Of course, when water is disposed under pressure in lines 10 and 11, then the valve 43 is closed. When water pressure is turned off, the valve opens so as to allow the swivel coupling to drain. As shown in FIG. 4, the direction at arrows C is shown to be outwardly through nipple 35' and to the water delivery system S'.

What is provided, therefore, is a trailweight or counterweight system which, by its design, keeps the riser or water delivery spray system pipe S of FIG. 1 erect, this by insuring that the friction of the seals at the swivel joint does not impede a correct swiveling action such that the length of riser pipe S in FIG. 1 is always vertically oriented normal to the ground plane. Leg 45 is designed to be sufficently long such that the torque effectively keeps the structure including axial nipples 35' and 36' in an erect vertical position. The length of the leg structure 45 will be such that slide surface 47'' will contact ground plane G over which the wheels 13 and 14 ride, and at that point the riser S is vertical, assuming a horizontal ground plane.

In FIG. 7, wheel-line central conduit 10 is this time provided with a water jacket or sleeve 50, provided with mutually spaced convex seal seat portions 51 and 52 which serve for the seating of water gaskets 53 and 54. The seals themselves may directly abut a sleeve-boss 55 which has a closely machined outer cylindrical surface 56, see FIG. 7, and which is welded to central conduit 10 for fixed disposition therewith. If desired, sleeve-boss 55 may include a gasket or seal seat 56', serving to seat the seal and also to deter actual side movement of the water jacket or sleeve 50.

Connected to and depending from each of the water jackets is a respective vertical conduit 58 and 59 each of which is supplied in elbow 60 and 61 connecting to apertured conduit 62, the combination comprising a counterweight. The same includes passageway 63 and 64 for receiving sprinkler heads 65 and 66 of whatever design.

In operation the FIG. 7 structure illustrates that the jackets 50 are precluded from revolvement by virtue of the pressured, water-filled, depending U-figured water delivery system R. Accordingly, such water delivery system not only effects the spraying, by virture of the nozzles or sprinkler heads 65 and 66, but also, because of water-contained in the pipe, is operative to counterweight the structure, the two water jackets or sleeves 50, so as to prevent their rotation, as otherwise by seal friction forces, relative to the central revolving conduit 10.

Thus, the sprinklers 65 and 66 remain vertically erect and the sleeves 50 stationary, rotationally speaking, even though the wheel line is driven forwardly by the revolving central conduit 10.

In FIG. 8 the water jacket 50 includes a downward aperture 67 which accommodates the threaded end 69 of depending leg conduit 70. The depending leg conduit terminates an upstanding foot 71 provided with sprinkler nozzle or head 72. In the embodiment shown in FIG. 8 the riser 73 may still be utilized in connection with the water jacket or sleeve 50; when so utilized, then there may be a pair of water delivery structures or sprinklers connected to a single sleeve. Thus, the conduit 70 provides for water passageway and delivery to the sprinkler 72, and, in addition, by virtue of the bottom 74 sliding on the ground plane, will provide a way whereby the tandem, mutually spaced sprinklers at 72 and 73 will both be held erect as for the desired sprinkling pattern.

The tubular member 10 with its boss or sleeve 55 will include water passageway apertures 31 and 31' in FIGS. 7 and 8, respectively, so as to allow water from conduit 10 to proceed to the respective water delivery structure.

While particular embodiments of the invention have been shown and described, it will be obvious to those skilled in the art the various changes and modification which may be made without departing from the essential features of the present invention and, therefore, the aim in the appended claims is to cover all such changes and modifications as fall within the true spirit and scope of the invention.

I claim:

1. An agricultural irrigation wheel-line including, in combination, a pair of horizontally spaced wheels; wheel-line conduit means, mounting said wheels, for conducting water to a water delivery system essentially upstanding from said wheel-line conduit means; an outer sleeve member; plural, mutually spaced seal means for rotatably sealing said outer sleeve member to and about said wheel-line conduit, said wheel-line conduit including aperture means for conducting water from within said wheel-line conduit to and within said outer sleeve member, between said seal means; water delivery structure mounted to and upstanding from said outer sleeve member; and trail weight structure comprising a rearwardly declining leg articulatively coupled to said outer sleeve member.

2. Apparatus according to claim 1 wherein said outer sleeve member includes a depending member, said rearwardly declining leg being pivotally journaled to said depending member.

3. Apparatus according to claim 1 wherein said trail weight structure also includes a weighted member affixed to said rearwardly declining leg proximate the lowermost extremity thereof.

4. Apparatus according to claim 1 wherein said outer sleeve member includes a tubular conduit portion downwardly extending therefrom, drain valve means coupled to said tubular conduit portion for draining water therefrom and from said outer sleeve member when liquid pressure is removed from said wheel-line, said rearwardly decling leg including hollow boss means retentively journaled to and about said tubular conduit portion.

5. Apparatus according to claim 1 wherein said wheel-line conduit means comprises a pair of mutually axially aligned central conduit, each of said conduit having mutually facing flanges, said wheel-line also including an apertured flanged sleeve secured to one of said flanges and a flanged collar secured to the remaining of said flanges and affixed to said flanged sleeve, said outer sleeve member circumscribing said flanged sleeve, said seal means being disposed between said outer sleeve member and said flanged sleeve.

6. Coupler structure for coupling a pair of axially aligned wheel-line conduits, including, in combination, tubular means constructed at opposite ends thereof for connection to said conduits, said tubular means being provided with medially disposed water passageway means, an outer sleeve member circumscribing said tubular means, seal means sealingly interposed between said tubular means and said outer sleeve member on opposite sides of said water passageway means, nominally vertical journal means affixed to and depending from said outer sleeve member, and a declining, rearwardly extending, ground-plane contacting leg journaled to said journal means for pivotal movement about a nominally vertical axis.

7. Apparatus according to claim 6 wherein said journal means comprises a depending tubular member, said coupler structure including a drain valve coupled to said depending tubular member, said depending tubular member being constructed for communication with the interior of said outer sleeve member.

8. Apparatus according to claim 6 wherein said coupler structure includes a depending tubular member affixed to and constructed for communication with the interior of said outer sleeve member, said leg including a journaling portion journaled to said depending tubular member, a retainer secured to said depending tubular member and retaining said journaling portion of said leg, and a drain valve affixed to said retainer.

9. Apparatus according to claim 6 wherein said coupler includes a counterweight secured to said leg proximate the lowermost extremity thereof.

10. Apparatus according to claim 6 wherein said leg includes a downwardly and rearwardly upturned end, and a counterweight affixed to and supported by said upturned end.

11. Apparatus according to claim 6 wherein said tubular sleeve means includes an elongated flanged sleeve, and a flanged collar secured to said flanged sleeve.

12. Agricultural, irrigation, side-roll wheel-line apparatus including, in combination, plural, mutually spaced wheels; essentially horizontal, elongate, wheel-line conduit means mounting said wheels and supplying pressurized irrigation water, said conduit means including at least one apertured portion having water passageway means; a sleeve having an interior and coaxially mounted over said apertured portion; plural, mutually spaced seal means revolvably sealing said sleeve to and about said apertured portion, said seal means being disposed on opposite sides of said apertured portion; water delivery structure mounted to and disposed in communication with said sleeve at the latter's interior; and fluid passageway counterbalancing means affixed to said sleeve for maintaining the same independent of the revolvement of said wheel-line conduit means, to thereby advantageously maintain the disposition of said water delivery structure at a predetermined position.

13. Agricultural, irrigation, side-roll wheel-line apparatus including, in combination, plural, mutually spaced wheels; essentially horizontal, elongate, wheel-line conduit means mounting said wheels for delivering torque thereto and for simultaneously supplying pressurized irrigation water, said conduit means including at least one apertured portion having water passageway means; a sleeve having an interior and coaxially mounted over said apertured portion; plural, mutually spaced seal means revolvably sealing said sleeve to and about said apertured portion, said seal means being disposed on opposite sides of said apertured portion; water delivery structure mounted to and disposed in communication with said sleeve at the latter's interior; and counterbalancing means affixed to said sleeve for maintaining the same independent of the revolvement of said wheel-line conduit means, to thereby advantageously maintain the disposition of said water delivery structure at a predetermined position, and wherein said conduit means includes plural, mutually spaced apertured portions, said sleeve and an additional sleeve being mutually and respectively mounted over said apertured portions, said plural seal means including respective pairs of mutually spaced seals sealingly disposed between said sleeves and said conduit means on opposite sides of said apertured portions, respectively, said apparatus including a U-configured water delivery structure having mutually spaced upstanding ends communicatively mounted to and beneath said sleeves, respectively.

14. Agricultural, irrigation, side-roll wheel-line apparatus including, in combination, plural, mutually spaced wheels; essentially horizontal, elongate, wheel-line conduit means mounting said wheels for delivering torque thereto and for simultaneously supplying pressurized irrigation water, said conduit means including at least one apertured portion having water passageway means; a sleeve having an interior and coaxially mounted over said apertured portion; plural, mutually spaced seal means revolvably sealing said sleeve to and about said apertured portion, said seal means being disposed on opposite sides of said apertured portion; water delivery structure mounted to and disposed in communication with said sleeve at the latter's interior; and counterbalancing means affixed to said sleeve for maintaining the same independent of the revolvement of said wheel-line conduit means, to thereby advantageously maintain the disposition of said water delivery structure at a predetermined position, and wherein said water delivery structure is upstandingly disposed relative to said sleeve, said apparatus also including a declining, rearwardly extending leg conduit communicatively affixed to said sleeve at a lower region thereof, said conduit including a lower foot and a second, water delivery structure mounted to said foot.

* * * * *